March 6, 1962 W. J. ROBINSON 3,024,063
ONE-MAN TRUCK BODY COVER
Filed Feb. 19, 1960 2 Sheets-Sheet 1
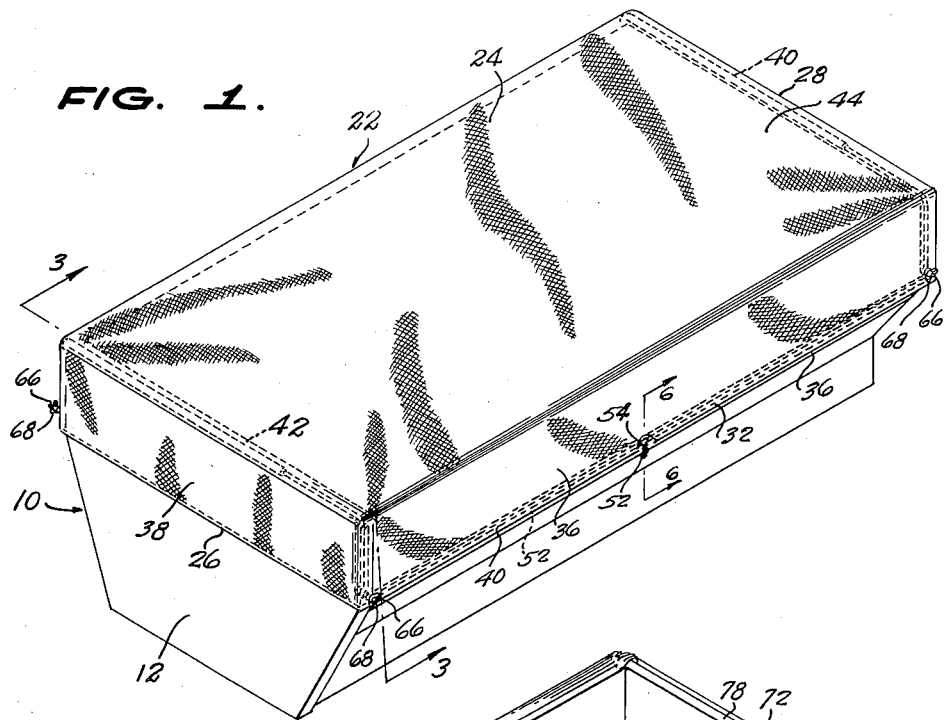
INVENTOR.
WILLIAM J. ROBINSON,
BY
McMorrow, Berman & Davidson
ATTORNEYS.

March 6, 1962 W. J. ROBINSON 3,024,063
ONE-MAN TRUCK BODY COVER
Filed Feb. 19, 1960 2 Sheets-Sheet 2
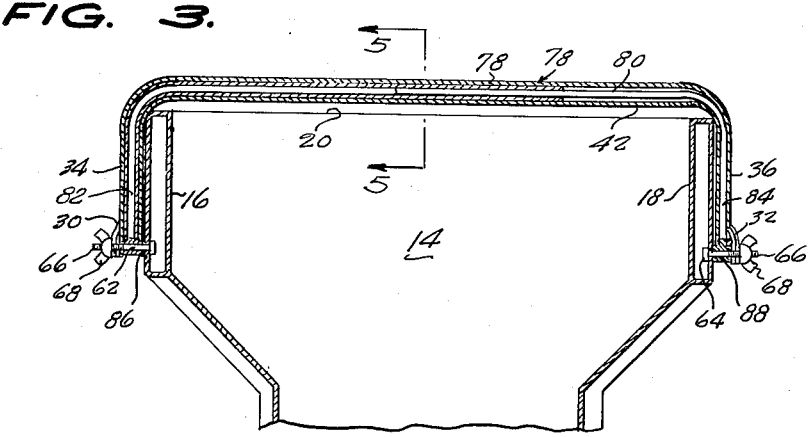
FIG. 3.
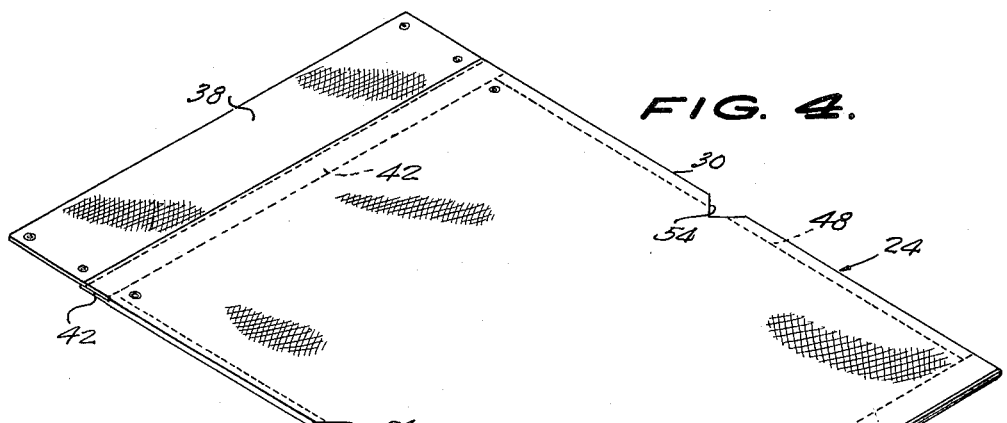
FIG. 4.
FIG. 5.
FIG. 6.
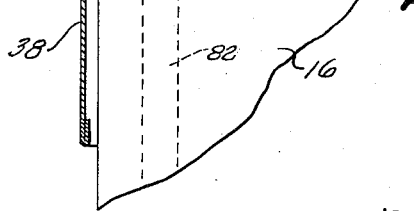
INVENTOR.
WILLIAM J. ROBINSON,
BY
McMorrow, Berman & Davidson
ATTORNEYS.

United States Patent Office 3,024,063
Patented Mar. 6, 1962

3,024,063
ONE-MAN TRUCK BODY COVER
William J. Robinson, Pembina, N. Dak.
(216 Fenton Ave., Grand Forks, N. Dak.)
Filed Feb. 19, 1960, Ser. No. 9,979
2 Claims. (Cl. 296—100)

This invention relates to an improved one-man tarpaulin cover for open top truck bodies and the like.

The primary object of the invention is to provide a cover of the kind indicated which provides for easy and quick removal and placement relative to the open top of a truck body, such as a grain carrying body, whereby loading and unloading time is saved, while being secured to the body against becoming accidentally loosened or lost.

Another object of the invention is to provide a cover of the character indicated above which is simple in construction, is composed of a small number of simple and easily assembled and installed parts, and which is devoid of mechanism which is liable to wear or to become jammed.

Other important objects and advantageous features of the invention will become apparent from the following description and the accompanying drawings, wherein, for purposes of illustration only, a specific form of the invention is set forth in detail.

In the drawings:

FIGURE 1 is a perspective view of an open top truck body covered by a cover of the invention;

FIGURE 2 is a perspective view like FIGURE 1, showing the cover removed from covering relation to the top of the body;

FIGURE 3 is a fragmentary vertical transverse section taken on the line 3—3 of FIGURE 1;

FIGURE 4 is a plan view of a tarpaulin, per se;

FIGURE 5 is an enlarged fragmentary vertical longitudinal section taken on the line 5—5 of FIGURE 3; and FIGURE 6 is an enlarged fragmentary vertical section taken on the line 6—6 of FIGURE 1.

Referring in detail to the drawings, wherein like numerals designate like parts throughout the several views, the numeral 10 designates a grain box truck body, having a forward end wall 12, a rear end wall 14, and opposed longitudinal side walls 16 and 18. These walls have in common a horizontal upper edge 20, defining the open top of the body 10.

In accordance with the present invention, a tarpaulin cover, generally designated 22, is mounted on the body 10 to cover and uncover its open top. The cover 22 comprises a tarpaulin 24 which is larger and wider than the body 10, and has a front end edge 26, a rear end edge 28, and longitudinal side edges 30 and 32.

The extra width of the tarpaulin provides longitudinal side flaps 34, 36 to engage the outer sides of the body side walls 16, 18 in the covering position of the tarpaulin, and a transverse front flap 38 to engage the outer side of the body front wall 12.

The rear end edge 28 of the tarpaulin 24 is finished with a transverse front hem or tube 40, and the front part of the tarpaulin is provided with a transverse front hem or tube 42, which is located at the rear edge or juncture of the front flap 38 with the main portion 44 of the tarpaulin. The main portion 44 is that part of the tarpaulin which extends between the side flaps 34, 36 and between the rear end edge 28 and the front flap 38.

Longitudinal side hems or tubes 48, 50 are provided along the side edges 30, 32 of the tarpaulin, and a light rigid rod 52 is contained in one or both side hems 48, 50, and notches 54 are cut through midlength parts of the side hems to enable hooks 56 on the upper ends of springs 58 to be securably engaged over the rods 52 so as to hold the side flaps down in place, the lower ends of the springs 58 being anchored to lugs 60 fixed on the related body side walls at points below the lowest reach of the side flaps, as shown in FIGURE 6.

At the ends of the body side walls 16 and 18, at levels below the lowest reach of the side flaps 36, 38, anchor bolts 62, 64 are secured through the body side walls and have threaded shanks 66 reaching laterally outwardly therefrom, on which are threaded removable wing nuts 68.

Similar front and rear telescoping inverted U-shaped retaining brackets 70, 72 each comprise reclining L-shaped pipe 74 and a reclining L-shaped bar 76, the pipe having a horizontal arm 78 slidably receiving the horizontal arm 80 of the bar 76, and the bar and the pipe having depending legs 82, 84, respectively, which have fixed on their lower ends tubular lugs 86, 88, which are slidably and removably engaged on related ones of the shanks 66 of the bolts 62, 64 at opposite sides of the body 10, with wing nuts 68 holding the lugs securely on the bolt shanks 66. The depending legs 82, 84 are of lengths to support the telescoped horizontal arms 78, 80 spaced above and close to the upper edge 20 of the body 10 at the front and rear ends thereof, with the telescoped arms extending through the front and rear tarpaulin hems or tubes 40, 42, whereby the tarpaulin 24 is positively held in a flat, taut position across the open top of the body 10, with the tarpaulin bearing upon the upper edge 20, and the side flaps 36, 38 against the outer sides of the body side walls 16, 18. the front flap 38 is pressed against the front side of the front end wall 12 of the body 10 by air pressure as the truck travels forwardly, so that lifting of the tarpaulin by air pressure at the front end thereof is prevented.

Uncovering of the open top of the truck body 10 is accomplished by releasing the spring hook 56 from the side flap rod 52 at one side of the body and then pushing or pulling the tarpaulin 24 along the bracket arms 78, 80 toward and to the opposite side of the body, so that the tarpaulin is out of the way in an accordion condition, as shown at 88 in FIGURE 2. While the cover 22 is thus in uncovering relation to the open top of the body 10, the cover 22 is nevertheless securely connected to the body, and the cover 22 can then be readily restored to its covering position by pulling it across the body and reconnecting the spring hook 56 with the rod 52.

In the event it is desired to entirely remove the tarpaulin 24 from the body 10, the wing nuts 68 are removed from the bolt shanks 66, the tubular lugs 86, 88 are removed from the bolt shanks 66 and the components of the brackets 70, 72 are telescoped apart, and either partially or wholly removed endwise from the related tarpaulin hems 42, 40.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a truck body having an open top, a front end wall, a rear end wall, and longitudinal side walls, said walls having a common upper edge defining the open top of the body, inverted U-shaped front and rear brackets extending across the body at the front and rear end walls thereof, each of said brackets having a horizontal arm and depending legs at the ends of the arm, said arms being positioned above the common upper edge of the walls and the legs at the outer sides of the body side walls, anchor means fixed on the outer sides of the body side walls at points spaced below said common upper edge in the regions of said front and rear end walls, said depending legs having lower ends securably and removably engageable with related anchor means for fixing the brackets in place, a tarpaulin wider and longer than said body, said tarpaulin having a rear edge having therealong rear connecting means slidably embracing the horizontal arm of the rear bracket, front connecting means on and extending across said tarpaulin at a point spaced rearwardly from the front end of the tarpaulin and slidably embracing the arm of the front bracket, said anchor means being bolts having shanks extending laterally outwardly from the body side walls, tubular lugs on the lower ends of the bracket legs removably engaged over the bolt shanks, and wing nuts threaded on the shanks and holding the tubular lugs thereon.

2. In combination, a truck body having an open top, a front end wall, a rear end wall, and longitudinal side walls, said walls having a common upper edge defining the open top of the body, inverted U-shaped front and rear brackets extending across the body at the front and rear end walls thereof, each of said brackets having a horizontal arm and depending legs at the ends of the arm, said arms being positioned above the common upper edge of the walls and the legs at the outer sides of the body side walls, anchor means fixed on the outer sides of the body side walls at points spaced below said common upper edge in the regions of said front and rear end walls, said depending legs having lower ends securably and removably engageable with related anchor means for fixing the brackets in place, a tarpaulin wider and longer than said body, said tarpaulin having a rear edge having therealong rear connecting means slidably embracing the horizontal arm of the rear bracket, front connecting means on and extending across said tarpaulin at a point spaced rearwardly from the front end of the tarpaulin and slidably embracing the arm of the front bracket, said tarpaulin having a main portion conforming in area with the area of the open top of the body and which reaches between said rear and front connecting means and which is spaced at its sides from the side edges of the tarpaulin so as to define longitudinal side flaps which depend along the outer sides of the truck body side walls, said rear and front connecting means extending along related ends of said side flaps, said side flaps having free longitudinal edges, and releasable securing means on the body side walls below the side flaps and engageable with the side flaps at their free edges, said securing means comprising spring hooks serving to tighten the tarpaulin crosswise of the open top of the truck body, said free edges of the side flaps having tubes therealong, rods contained in and extending along the side flap tubes, with which said spring hooks are engaged.

References Cited in the file of this patent
UNITED STATES PATENTS

| | | |
|---|---|---|
| 2,463,646 | Schassberger | Mar. 8, 1949 |
| 2,465,621 | Wheeler | Mar. 29, 1949 |
| 2,565,746 | Turner | Aug. 28, 1951 |
| 2,757,042 | Schultz | July 31, 1956 |